United States Patent Office 3,196,122
Patented July 20, 1965

3,196,122
CEMENTITIOUS COMPOSITIONS CONTAINING ACRYLIC ESTER POLYMERS
Robert M. Evans, Chesterland, Ohio, assignor to The Master Mechanics Company, Cleveland, Ohio, a corporation of Ohio
No Drawing. Filed Feb. 14, 1964, Ser. No. 344,827
17 Claims. (Cl. 260—29.6)

This invention relates to an acid-resistant cementitious material, to the manner of compounding it, and to the manner of using it, particularly a cementitious material of this kind containing a polymeric latex.

This application is a continuation-in-part of my copending application Serial No. 796,199, filed March 2, 1959, now abandoned, which is a continuation-in-part of my application Serial No. 517,903, filed June 24, 1955, now abandoned.

Cementitious materials incorporating polymeric latices have been known in the past. In general, however, such latices have been based on natural rubbers, on more or less related rubber-like substances of natural origin, or on synthetic resins having physical properties akin to those of natural rubber such, for example, as the polyacrylonitriles. Cementitious materials containing such latices have developed fair strengths in thin layers but as a rule have had poor working characteristics and have not adhered well to other materials. The disadvantages have tended to outweigh the advantages with the result that in the past only rather limited use has been made of cementitious materials containing such latices.

More recently, cementitious materials have been made incorporating vinyl polymers and copolymers, particularly polyvinyl acetate. Such compositions, whether used in surfacing new floors, mending existing concrete surfaces, or making joints between blocks, give products having reasonably good strengths but poor resistance to water, aqueous processing media, and acids of the kinds commonly met with in industrial practice. Experiments with cementitious materials so made up are reported in "Industrial and Engineering Chemistry," April 1953, page 759 et seq. The reported data establish that exposure to moisture is deleterious, due apparently to the relative ease with which polyvinyl acetate is affected by water.

The polymers used in the cementitious composition of the present invention function quite differently from polymers of vinyl acetate because they react with the calcium of the cement to provide a chemical bond. Apparently, the acrylate groups of the polymer, which are less stable toward hydrolysis than methacrylate groups, hydrolyze to form an alcohol and to form an acrylic acid group on the polymer chain which reacts with the calcium of the cement to increase the strength of the concrete as disclosed, for example, in the article by Gerould Allen appearing at pages 1661 to 1665 of "Official Digest," December 1959. Because of this chemical bonding, it is desirable to use a relatively large amount of cement and a polymer formed predominantly of ethyl acrylate or other alkyl acrylate to obtain the maximum advantages of the invention (for example, when making concrete floors). In the case of cementitious compositions employing polyvinyl acetate, any hydrolysis of the acetate groups of the polymer leaves on the backbone of the polymer alcohol groups which cannot react with the calcium of the cement to form a stable chemical bond.

For special purposes, cementitious materials of the nature of slurries have been heretofore devised incorporating water-soluble salts of polyacrylic acid and the partially hydrolyzed polyacryloamids. Such slurries, which are described in Lea Patent 2,614,998, granted October 21, 1952, are said to be characterized by a low water loss and by a retarded set. By virtue of these attributes, the slurries are said to be usable for grouting cracks in masonry structures and in cementing oil wells, where there is a tendency for a slurry to lose water to such an extent that the cementitious material becomes prematurely dehydrated, set or cracked. These deficiencies are attributed to incomplete hydration of the cement, which, it is said, may be minimized by incorporating in the cement a solution of a water-soluble synthetic resin.

It is an object of the present invention to provide an acid-resistant cementitious material containing a commercial latex derived from a water-insoluble synthetic resin, which cementitious material, in its more dilute forms, lends itself to use as an adhesive, masonry paint, grout or the like. In such dilute forms, the cementitious material may to advantage be composed largely or entirely of finely divided hydraulic pigments or the like, and a minor amount of a commercial polyacrylate latex derived from one or more water-insoluble monomers, such as 2-ethyl hexyl acrylate or ethyl acrylate, and having a low glass transition temperature. As will appear, cementitious materials of this type are susceptible of a wide variety of uses. Detailed examples of such uses, together with preferred compositions, are given below.

A further object of the invention is to provide a more concentrated material of the same general type that is usable in the same way as ordinary cementitious mixtures for forming poured floors, walls, ceilings, etc.

Still a further object of the invention has to do with the use of a still more concentrated material in the form of a paste, mortar or patching cement. In this form, the invention may be utilized to good advantage to repair damage in pre-existing structures such, for example, as a concrete sidewalk, floor, ceiling or the like. In general, sidewalks, floors and ceilings of concrete are subject to premature deterioration due to the effects of such factors as their poor resistance to abrasion, spalling under atmospheric influences, and a susceptibility to damage by chemicals. According to methods known prior to this invention, the repair of deteriorated concrete surfaces was time consuming, expensive and often unsatisfactory, the latter partly because of a failure to bring about adequate adhesion between old and new materials. The present invention obviates these disadvantages by providing a cementitious material which is easy to apply, which adheres well, and which in general stands up at least as well as the original material.

Still a further object of the present invention is to provide a cementitious material which, in use, is not readily susceptible to leaching out, to hydrolysis by aqueous media, or to corrosive attack by acids such as lactic acid, citric acid and various other acids, organic and inorganic, of the types encountered in industry. These acids are not usually regarded as strong acids; however, they are responsible for much damage in dairies, food canneries, bottling plants, etc. To minimize damage of this sort, the invention makes use of a commercial latex derived from a water-insoluble polyacrylate in the cementitious material of which the floors, walls, ceilings, etc. are formed.

Another object of the invention is to provide a cementitious composition of a consistency lending itself to working without using excessive amounts of water so that maximum strength may be obtained in the resulting concrete or cementitious coating.

Other objects, advantages and features of the invention will be apparent from the following description, which includes a variety of illustrative examples.

In all of the various forms which the cementitious materials of the invention may take, a finely divided cement is one of the ingredients. In every case the cement is one of the types that are referred collectively to in the cement art as "hydraulic cements." Included are all of the Portland cements of the various types, the white cements, the natural cements, puzzolanic cements (including cements derived from industrial slags), the aluminous cements, and, in general, all of the commercially available hydraulic cements. Also included are hydraulic limes and similar materials of kinds well known to those skilled in the art.

In general, polyacrylic latices of types that may be used to advantage in the practice of the present invention are water-based latices containing polymers of one or more monomers, each of which has the structural formula

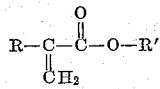

wherein R is selected from a group consisting of hydrogen, the alkyl radicals of the series —$C_nH_{2n+1}$, and the phenyl, tolyl, xylyl and benzyl radicals, and wherein R' is selected from the same group, not including hydrogen. The carboxy group causes bonding to the calcium of the cement to produce a particularly stable complex; the reaction product is difficult or impossible to saponify, as evidenced by its resistance to attack by the alkaline pore water of the cementitious product that results from the setting of a cement containing a polyacrylate inclusion.

Examples of polyacrylic latices of this type are latices of 40 to 50% solids content with a particle size of from 0.1 to 1.0 micron that have been compounded from polymers of methyl acrylate, ethyl acrylate, propyl acrylate, butyl acrylate and other alkyl or paraffin esters of acrylic acid having up to 18 or more carbon atoms in the paraffin radical. It is not necessary to the practice of the invention that all of the esters used in forming the polymer be derived from acrylic acid as such; instead, a large part of the polymer may be and often is, derived from methyl acrylic acid, ethyl acrylic acid, and other acids of the same homologous series having up to eighteen carbon atoms in the substituent. In general, those latices considered to be of maximum value under present economic conditions are ones containing polymers and copolymers of the esters of acrylic and alpha-methyl acrylic acid, particularly well known commercial acrylic acid esters.

Preferred for purposes of the invention are commercially prepared polyacrylic latices having polymers with low glass transition temperatures such as that supplied by the Rohm & Haas Company, Philadelphia, Pennsylvania, under the trademark Rhoplex AC–33, which has a glass transition temperature of 12° C., which contains about 46 to 47% solids, which has a pH of about 9, which has a specific gravity of 1.04 and which has a particle size below about 0.5 micron as disclosed in my application Serial No. 517,903. The particle size is described as medium.

Soon after Rhoplex AC–33 was announced to the paint industry as an emulsion paint vehicle, it was described in the April 23, 1953, issue of Paint, Oil & Chemical Review as a 100% acrylic dispersion in water, and it was there indicated that the resin itself is fully polymerized and that its films dry solely by evaporation of water. Rhoplex AC–33 was described in 1954 as a polyacrylic copolymer, and the latex was said to have a viscosity at 25° C. of 65 to 80 KU and a weight of 8.67 pounds per gallon. Its infrared spectra appears in spectrogram D1211 published by Sadtler Research Laboratories. The glass transition temperature of the Rhoplex AC–33 copolymer (12° C.) is inherently a function of the percentage of each monomer used to form the copolymer. Rhoplex N latices are non-ionic dispersions. The American Polymer Company, Peabody, Massachusetts, a division of The Borden Company, is the source of the polyacrylic latex designated as A–31 with a pH of from 4 to 6 and a particle size of about 0.5 micron. Also furnished by the American Polymer Corporation is the polyacrylic latex designated A–165 with a pH of 4 to 6 and a particle size range from 0.4 to 0.5 micron. The specifications on these latices are available to the public from advertising literature published by the respective companies.

The Rhoplex latices are formed by copolymerizing a plurality of acrylic ester monomers, such as ethyl acrylate, the amounts of the different monomers being selected to give the desired second-order transition temperature. The method employed to form these latices may be generally as described in the article "Acrylic Monomers in Coating Vehicles," by E. H. Riddle, which appears at pages 34, 35 and 67 of the July 1955, issue of "Paint and Varnish Production." Conventional emulsifiers, such as non-ionic emulsifiers, are generally used in the conventional emulsion polymerizations. Rhoplex AC–33 is formed by copolymerizing a mixture of acrylic ester monomers comprised essentially of a major part of ethyl acrylate and a minor part of methyl methacrylate sufficient to provide the resulting copolymer with a second-order transition temperature of 12° C. Rhoplex FRN is a copolymer essentially of a major portion of ethyl acrylate and a very small portion of acrylonitrile having a glass transition temperature of —5° C. It has a pH of about 6 and a medium particle size.

The copolymers and other polymers present in the various polyacrylate (polyacrylic) latices referred to in the preceding paragraph are of the film-forming type at room temperatures (i.e., at ordinary room temperatures they are above their glass transition temperatures). In many cases, the film formed thereby is a tacky film. In general, those latices which give a powder-like product rather than film at room temperature are less desirable or undesirable for the purposes of the present invention; such latices are excluded from the term "film-forming" as herein used. The second-order transition temperature of the polymer itself is relatively low (i.e., below room temperature and preferably not in excess of 16° C.), being as low as —5° C. in the case of Rhoplex FRN.

The novel composition of this invention is predominantly cementitious and contains a moderately large amount of cement several times greater than the amount of the copolymer or other polymer in said composition. The amount of the polymer should be a small fraction of the amount of the cement and is generally less than one part of emulsion solids for each 3.7 parts of cement but greater than one part of emulsion solids for each 20 parts of cement. If the polymer is present in larger amounts (i.e., an amount substantially greater than one part for each 3.7 parts of cement), the product tends to be deficient in desirable properties that are attributable to the presence of the cement (i.e., abrasion resistance, flexural strength, hardness, etc.). If, on the other hand, the polymer is present in a very small amount (i.e., substantially less than about one part for each 30 parts of cement), the product may be deficient in desirable properties such as adhesion strength, tensile strength, acid resistance, etc. The use of only 3 parts of polymer per 100 parts of cement can, however, provide beneficial results because of the reaction with the calcium of the cement.

Depending upon the intended nature of the product, the amount of water used with the cement may vary over a very wide range. If, for example, the product is to be used as a masonry paint or plaster, large quantities of water can be used to disperse the cement. In the case of grouts, which are generally somewhat thicker than paints but still highly fluid, a lesser quantity of water can be used. Where the purpose is to provide an adhesive, the amount of water may be still further reduced. Usually the quantity of water will be at its minimum if the product is intended for the construction of new walls, ceilings, floors or the like for use as a mortar, patching cement or the like. In general, the minimum quantity of water consonant with good working properties will be preferred because of the common tendency of excessive water to impair the physical properties of hydraulic cements.

The order of addition of the various ingredients is not critical for various commercially acceptable mixing procedures are suitable for purposes of the invention.

Frequently, it is advantageous to incorporate sand in the mixture. The nature of the sand will be dictated by the intended use of the product. For masonry paints or plasters, it is possible to use any kind of sand of small particle size, preferably one having a diameter of one millimeter or less. On the other hand, where the product is subject to exacting requirements, as in the case of a cement patch applied to an existing concrete floor, graded sands of medium particle size such as "Ottawa" sand and "Best" sand or a mixture of the two may be used to better advantage. Ottawa sand is a silica sand of the type referred to as "round." Best sand is of the type known as "sharp." In both cases, fines will have been removed. In general, however, the sieve size of the sand may vary over a fairly wide range.

In lieu of or in addition to sand, it is possible to use ground glass, emery powder, ground slag, fine gravel, trap rock and similar aggregates.

As will appear, it is often advantageous to incorporate in the mixture, with or without sand, a minor fraction of clay; if so, the clay may take the form of kaolin or china clay, porcelain clay, fire clay, pipe clay, bentonite, and, in fact, almost any of the known types of clay. Because the type of clay sometimes has an effect on the water demand of the cement, it is occasionally desirable to avoid the use of clays which markedly increase the water demand. If, for example, a pasty mixture is desired (as opposed to a thin, fluid product), kaolin and similar clays will be preferred to bentonite, although the latter may be used to excellent advantage where a low water content is not a controlling factor. As a rule, the use of clay is desirable in a stiff paste such as that used for cement patching purposes, this for the reason that the clay tends to enhance the workability of the mixture. In some cases it serves also to reduce the setting time.

Various other substances may be added to the cementitious material, particularly in its more concentrated forms; for example, sodium silicate, type GD, which helps promote dry and wet adhesion. Most dispersing agents have a tendency to reduce the tensile strength: such are in general to be avoided. However, materials such as carboxy methyl cellulose, methyl cellulose, ethyl cellulose, ammonium polyacrylate, etc. may be incorporated for thickening purposes or for the purpose of improving the workability, finish or both. Although organic in nature, they do not, so far as known, impair the acid-resistance characteristics of the final product. Inorganic reinforcing materials such as iron filings, asbestos fibres, glass fibres, etc. may be included or excluded as desired. Numerous other materials may be introduced into the mixture for these and other similar purposes including antimycotics, antifoams, water-reducing agents and the like.

When making concrete structures or floor coverings by the present invention, which compositions contain large amounts of crushed trap rock or other aggregate and substantial amounts of sand, it has been discovered that extremely good wet strengths accompanied with good dry strength can be obtained provided that the amount of the hydraulic cement is substantially greater than the amount of sand and preferably 1.5 to 2 or 3 times the amount of sand. Excellent results are obtained in concrete compositions comprising one part of sand, 1.5 to 2.5 parts of a hydraulic cement, an amount of rock or aggregate in excess of the amount of said cement and preferably not in excess of 4 parts, and a small amount of water and water-dispersed particles of a film-forming polyacrylate of the type described herein. The amount of such polyacrylate is a small fraction of the amount of said cement. Best results are usually obtained using crushed trap rock (granite) and sharp sand (i.e., Best sand) as the aggregate.

When forming pastes or plasters (paints), the coarse aggregate must, of course, be eliminated. If it is desired to form relatively thick wall coatings, it is desirable to add a thickener such as polyacrylic acid. For some reason, the plastering compositions of the present invention are capable of providing wall coatings as thick as ½ inch whereas, prior to this invention, it was not practical to form cementitious wall coatings with a thickness greater than about ¼ or ⅜ inch.

If the cementitious compositions are to be used in forming very thin layers, the amount of sand can be reduced or eliminated and it is often desirable to employ a flowing agent such as ammonium caseinate or other alkaline caseinate. The amount of water can be increased to improve the flowability, but excessive amounts of water reduce the strength of the final product.

The present invention is particularly important in the field of wall coverings because of the ability to form thick layers. The invention is also important in the masonry field because of the high tensile and adhesive strengths. It is possible, for example, in making prefabricated buildings, to lay the bricks to form a wall and then hoist the wall to position on the building while supporting it in an almost horizontal position in such a way as to subject it to bending stresses.

In the practice of this invention, it is preferable to employ film-forming polymers containing a high percentage of acrylate groups, derived from esters of acrylic acid, which can readily hydrolyze and react with the calcium of the cement. The polymer is preferably formed by non-ionic emulsion polymerization of a monomeric material comprising essentially a major portion of an alkyl acrylate such as ethyl acrylate or 2-ethylhexyl acrylate and no more than a minor portion of another ester of acrylic or methacrylic acid or a similar acrylic compound. Such monomeric material may include substantial amounts of acrylonitrile, acrylic acid or methacrylic acid. Major amounts of methylmethacrylate are undesirable in making the polymer, but minor amounts of this monomer (i.e., 10 to 30 percent of the monomeric material forming the polymer) are desirable because of its low cost as compared to alkyl acrylates.

In this invention it is desirable to employ copolymers essentially of alkyl acrylates and methyl methacrylate, such as a copolymer of 70 to 75% ethyl acrylate and 20 to 25% methylmethacrylate or a copolymer of 70 to 75% ethyl acrylate, 15 to 25% methyl methacrylate and 1 to 5% or so of acrylic or methacrylic acid. Excellent results are also obtained with film-forming polymers formed essentially from ethyl acrylate, such as copolymers of 95 to 99% ethyl acrylate and 1 to 5% or so of acrylonitrile, acrylic acid or methacrylic acid or homopolymers of ethyl acrylate. The above polymers have second-order transition temperatures below ordinary room temperature.

In the following examples, what is referred to as "polyacrylic latex" is a latex of the type previously described containing polymerized alkyl esters of acrylic acid and alpha-methyl acrylic acid having a total solids content of 40 to 50%.

In a typical case, an acid-resistant masonry paint within the purview of the invention may consist of the following, all in parts by weight:

(1) White cement _____ 100
(2) Ottawa sand (AFA 70) _____ 50
(3) Rhoplex AC–33,* polyacrylic latex (46–47% solids) _____ 29
(4) Titanium dioxide (pigment grade) _____ 10
(5) Water _____ 21

*A copolymer essentially of a major amount of ethyl acrylate and a minor amount of methyl methacrylate in proportions to provide a glass transition temperature of 12° C.

In relation to the other ingredients, the cement may be varied between about 50 and about 150 parts; the latex between about 15 and about 40 parts; the water, between one part or less and 55 parts or more. Colorants such as iron oxide, Hansa yellow, toluidine red, etc. may be added if desired.

The following, likewise in parts by weight, is an example of an acid-resistant adhesive:

| | |
|---|---|
| (1) Portland cement (Type II) | 100 |
| (2) Polyacrylic latex | 30 |
| (3) Sodium silicate (ratio of $Na_2O$ to $SiO_2$ is 1 to 3.22) | 5 |
| (4) Water | 15 |

The proportions may vary widely from those given above. If desired, clays may be used in the formulation, particularly such clays as china clay, in which case from 5 to 20 parts of clay may be present.

The following is an example of a mixture that may be used as a cementitious plaster (paint) or grout, depending on the amount of water ((all parts are parts by weight):

| | |
|---|---|
| (1) White cement | 150 |
| (2) Sand (AFA) 20) | 75 |
| (3) Commercial polyacrylic latex* (45% solids) | 90 |
| (4) Water | Q.s. |

*A copolymer essentially of a major amount of ethyl acrylate and a minor amount of methyl methacrylate.

This type of mixture, which may contain water-dispersible colorants, anti-foaming agents, fungicides, etc., gives an acid-resistant product in which the ratio of emulsion solids to cement is approximately 1 to 3.7.

An acid-resistant material for pouring purposes, as for making sidewalks, floors, walls, ceilings, etc., may be made by combining the following ingredients (parts by weight):

| | |
|---|---|
| (1) Portland cement (Type I) | 150 |
| (2) Best sand | 75 |
| (3) Ottawa sand | 75 |
| (4) Rhoplex AC–33,* polyacrylic latex (46–47% solids) | 42 |
| (5) Kaolin | 6 |
| (6) Sodium silicate, grade GD (ratio of $Na_2O$ to $SiO_2$ is 1 to 2.0) | 2 |
| (7) Water | 18 |

*A copolymer essentially of a major amount of ethyl acrylate and a minor amount of methyl methacrylate in proportions to provide a glass transition temperature of 12° C.

This material gives a hard, adhesive product with good flexural strength, wet and dry tensile strengths upwards of 400 p.s.i. and a wet adhesion strength upwards of 175 p.s.i.

Still another example of an acid-resistant cementitious material within the purview of the invention is the following:

| | |
|---|---|
| (1) White cement ("Medusa White") | 100 |
| (2) Best sand (AFA 35) | 200 |
| (3) Rhoplex FRN,* polyacrylic latex (40% solids) | 40 |
| (4) Ultramarine pigment | 7.5 |
| (5) Water | 20 |

*A copolymer of a major amount of ethyl acrylate and a very small amount of acrylonitrile in proportions to provide a glass transition temperature of about −5° C.

Cementitious materials of this type have a degree of hardness rendering them particularly suitable for new floorings. The hardness is such that in so-called "pencil scratch" tests, the wet materials are not scratched by a 4-H pencil after one week of curing.

Used as an acid-resistant patching cement, the cementitious materials of the present invention may be employed in the form of the stiff paste obtained by using the following formula (parts by weight):

| | |
|---|---|
| (1) Portland cement (Type I) | 150 |
| (2) Best sand (AFA 35) | 75 |
| (3) Ottawa sand (AFA 70) | 75 |
| (4) Rhoplex AC–33,* polyacrylic latex (46–47% solids) | 42 |
| (5) Kaolin | 6 |
| (6) Water | 18 |

*A copolymer essentially of a major amount of ethyl acrylate and a minor amount of methyl methacrylate in proportions to provide a glass transition temperature of 12° C.

In preparing for patching, the original cement should be freed of grease by means of a strong alkaline cleanser such as caustic soda, sodium metasilicate, trisodium phosphate or the like; etched with dilute acid; cleaned with a stiff wire brush; and thoroughly moistened with water.

Thereafter, the paste may be troweled into place to form a layer preferably averaging not less than about ⅜ inch thick over its surface. The product is characterized by excellent flexural strength, high adhesion strengths (approximately 300 to 400 p.s.i.), high wet tensile strengths (upwards of 385 p.s.i.), and high dry tensile strengths (upwards of 850 p.s.i.). It stands up well under the conditions which prevail in dairies, canneries, bottling plants, etc.

The following, likewise in parts by weight, is an example of a material that is suitable for the middle or filler layer of a cementitious laminate consisting of three layers respectively having thicknesses of ½ inch (top), 3 inches (middle), and ¼ inch (bottom):

| | |
|---|---|
| (1) Portland cement | 150 |
| (2) Sand | 300 |
| (3) Gravel | 450 |
| (4) Commercial polyacrylic latex (45% solids)* | 16.7 |
| (5) Water | Q.s. |

*A copolymer essentially of a major amount of ethyl acrylate and a minor amount of methyl methacrylate.

No water is necessary if a stiff mixture is desired, although the inclusion of water is not precluded. It will be noted that the ratio of emulsion solids to cement is approximately 1 to 20.

The following is an example of a cementitious flooring composition for making an acid-resistant concrete floor:

| | | |
|---|---|---|
| (1) Terpolymer* latex (45% solids) | parts | 79.4 |
| (2) Water | do | 19.1 |
| (3) Antimycotic (water-soluble substituted phenol salt) | parts | 0.4 |
| (4) Antifoaming agent (long-chain alcohol) | parts | 0.4 |
| (5) Water reducing agent (purified lignosulfonate) | parts | 0.7 |
| (6) Ice water | grams | 15 |
| (7) Trap rock (crushed) | do | 1000 |
| (8) Portland cement (Type I) | do | 667 |
| (9) Sand (sharp ⅛ inch) | do | 333 |

*A terpolymer of 73% ethyl acrylate, 25% methyl methacrylate and 2% methacrylic acid having a glass transition temperature of 5° C.

Items (1) to (5) are mixed together to form a liquid, and 182 milliliters of such liquid are mixed with the crushed trap rock and the sand. Then the ice water (0° C.) and the cement are added to complete mixing of the cement composition, the cement being added slowly.

A concrete floor made from the above composition is characterized by high wet and dry tensile strengths, good flexural strength, high adhesive strength, and excellent acid resistance. It is far superior in wet strength to a similar composition containing a smaller amount of cement and a greater amount of sand in excess of the amount of cement.

The following is an example of a cementitious composition for plastering cement blocks:

(1) Terpolymer* latex (45% solids) _____parts__ 97.1
(2) Water _____do____ 1.0
(3) Antimycotic _____do____ 0.6
(4) Antifoaming agent _____do____ 0.5
(5) Thickener (aqueous suspension of polyacrylic acid) _____parts__ 0.7
(6) Aqua ammonia _____do____ 0.1
(7) Water _____quarts__ 2
(8) White Portland cement _____pounds__ 44

*Same terpolymer as in immediately preceding example.

Items (1) to (6) are mixed together to form a liquid, and one gallon of such liquid is mixed with the 2 quarts of water and with the Portland cement to complete the plastering composition, the cement being added slowly.

The above plastering composition has exceptional utility in providing low cost, high quality, wall coatings particularly because of the ability to form thick ½ inch layers. Heretofore, it was considered impractical to make the wall coatings thicker than about ¼ or ⅜ inch with prior art cementitious compositions.

In all of the foregoing examples, cement and a polyacrylic latex of one of the kinds already described form at least a large part of the composition. Usually, water is included, although in some cases water is not required. In the more concentrated compositions, such as the stiff pastes used for patching purposes, aggregates, sand, clay and, if desired, inorganic fibres for strengthening purposes will usually be present. In the less concentrated (watery) forms of the invention, as where the material is used as a masonry paint, some of the ingredients that have been mentioned in the examples may be absent. Sundry other ingredients may be incorporated, examples being organic and inorganic pigments for coloring purposes.

It is apparent that variations in the ingredients and in the ratios of the ingredients are permissible. For example, the quantity of the latex may be varied over a wide range, although the use of a polyacrylic latex of 46 to 47% solids content in the ratio of 19.5 parts by weight of emulsion solids to 150 parts of cement (1:7.7) has been found to give particularly satisfactory results. The amount of water varies according to the mixture. In a stiff paste, it is usually somewhat more than half that normally required in similar mixtures lacking the polyacrylic latex inclusion. This makes for a workable mixture giving good tensile strengths. In general, too high a water demand indicates a poor stability on the part of latex to the inorganic complexes that are present in cements.

Holding constant the amount of the polyacrylic latex, the ratio of cement to sand may be varied over a range which at one extreme permits the use of well over 300 parts of cement to 100 parts of sand and, at the opposite extreme, of well under 100 parts of cement to 300 parts of sand. Although it has been found desirable to mix sharp and round sands as already explained, either may be used to the exclusion of the other. If they are used together, it is not necessary that they be used in equal amounts. Clay, if used, will ordinarily be a minor fraction of the whole, normally from about 3 to 20 parts of clay for each 150 parts of cement.

Mention has already been made of the fact that cementitious mixtures obtained as hereinabove described are more resistant to acids than are ordinary cementitious materials. This is evident from the following tabulation, which shows the change in weight of briquettes which were exposed for varying periods of time to 10% hydrochloric acid, 10% citric acid and 10% lactic acid in water solution.

| Material | Percent Change in Weight | | | | | | |
|---|---|---|---|---|---|---|---|
| | 10% HCl | | 10% Citric | | 10% Lactic | | |
| | 24 hrs. | 1 wk. | 24 hrs. | 1 wk. | 24 hrs. | 1 wk. | 11 days |
| Portland Cement (Control) | −8.7 | −12.7 | −2.9 | −32.8 | −4.3 | −11.2 | −20.0 |
| Portland Cement, 100 parts; Sand, 200 parts; Polyacrylic Latex, 42 parts; Clay, 6 parts; Water, 6 parts | −2.6 | −2.8 | −2.6 | −17.3 | −0.6 | −5.6 | −15.6 |

In every case, the material incorporating the polyacrylic latex suffered a smaller loss of weight than the control.

The following tabulation shows on a weight basis the results obtained with cement chips. Various types of cement were used, 150 parts in each case, and 75 parts of Ottawa sand, 75 parts of Best sand, 6 parts of clay and 42 parts of a water-insoluble polyacrylic latex (Rhoplex AC–33).

| | Water Absorption, percent | Percent Change in 10% Lactic | | Percent Change in 10% Citric | | Percent Change in 10% HCl. | |
|---|---|---|---|---|---|---|---|
| | | 24 hrs. | 96 hrs. | 24 hrs. | 72 hrs. | 24 hrs. | 72 hrs. |
| Portland Cement | 5.4 | −3.3 | −15 | −1.8 | −4.9 | −3.8 | −4.7 |
| White Cement | 2.8 | +0.3 | −6.0 | −1.2 | −5.4 | +1.6 | −0.7 |
| Aluminous Cement | (¹) | +0.1 | −3.5 | +3.1 | −2.8 | −3.4 | −6.4 |
| ½ Portland, ½ Aluminous | 1.8 | −1.3 | −3.9 | −1.3 | −5.5 | −3.8 | −6.0 |

¹Disintegrated.

From this tabulation, it is evident that in some cases there was no loss of weight. Instead, a gain in weight resulted, apparently due to absorption of water. In similar circumstances, ordinary cements lacking the inclusion of the water-insoluble polyacrylic latex would be badly corroded.

To determine corrosion on a comparative basis, samples of two cementitious materials, one containing and one omitting the polyacrylic latex inclusion of the present invention, were exposed as described to the action of each of four different acids. In each case, the acid was allowed to drip over a 2 inch by 10 inch surface. The acid was replaced whenever it was one-third spent. After every 900 ccms., the surface was brushed fifty times with a brass suede brush. Whatever came off was collected in a filter, dried and weighed.

The following tabulation, in which weights are expressed in pounds per 400 liters of acid, does not reflect any weight loss attributable to actual dissolution in the various acids but only those parts of the aggregate weight losses that are reflected by solids capable of being filtered off, dried and weighed.

| Acid | Typical Portland Cement | Typical Acrylate Cement |
|---|---|---|
| Sulfuric, 0.2 N | 1.58 | 0.22 |
| Lactic, 0.1 N | 9.9 | .30 |
| Hydrochloric, 0.1 N | 10.0 | .11 |
| Citric, 0.1 N | 5.3 | 0.22 |

In each case, the values in the second column constitute minor fractions of those in the first, indicating that the corrosion is relatively small.

Apart from this greatly enhanced resistance to acids, it has been found that in a polyacrylate cement wear factors as developed by a Taber Abraser, Research Model, are far lower than in the case of ordinary Portland cement. To test for wear, blocks were cast measuring 3½ inches square by ¼ inch thick. They were eroded on a Taber Abraser. The blocks were weighed both before and after being eroded. Wear factors were calculated according to the formula:

$$\frac{\text{Loss of wt. in mg.} \times 1000}{\text{No. of cycles}}$$

Using a load of 1000 g. and a CS-17F wheel, the following wear factors were obtained.

| | |
|---|---|
| Typical Portland cement (2 parts sand, 1 part cement) | 15,760 |
| Typical oxychlor cement | 1,220 |
| Polyacrylate cement (150 parts cement, 150 parts sand, 42 parts latex, 6 parts clay and 20 parts water) | 920 |

These figures indicate that under abrasion cements with water-insoluble polyacrylate inclusions stand up better than oxychlor cements and much better than Portland cements.

Experimental installations have confirmed these results by demonstrating that cementitious materials made up in accordance with the teachings of the present invention far outlast conventional cementitious surfaces.

In the cement art, quantities and values usually have to be determined empirically. The reason resides in the fact there are a great many variables which affect both the process and product. The inclusion of a polyacrylic latex derived from one or more water insoluble monomers does not change this state of affairs. The preferred balance still has to be determined on the basis of a limited amount of experimentation.

Nevertheless, the above data show that the addition of polyacrylic latices of the type described herein are helpful in giving products that will stand up well under highly unfavorable environmental conditions.

An acid-resistant cementitious composition is prepared from an emulsion-polymerized homopolymer of ethylacrylate having a glass transition temperature of −21° C. using the following recipe:

| | Parts by weight |
|---|---|
| (1) Portland cement (Type I) | 667 |
| (2) Sand | 333 |
| (3) Water | 30 |
| (4) Ammonium caseinate | 14 |
| (5) Antifoaming agent (waxy alcohol) | 1.0 |
| (6) Water reducing agent( calcium lignin sulfonate) | 3.0 |
| (7) Polyethyl acrylate latex (36% solids) | 167 |
| (8) Trap rock (crushed) | 1000 |

In mixing the composition, water is added to the latex to thin it out, and the trap rock and sand are mixed with the diluted latex and all the other ingredients, except the cement, before the cement is added. The cement is then added slowly to the mixture to complete preparation of the cement composition. After the composition has been shaped and cured at ambient temperature for 3 days and then further cured at 60° C. for 3 more days, its dry tensile strength is 1000 p.s.i. and its adhesive strength is 215 p.s.i. Because of the use of ammonium caseinate, the batch of this example is relatively stable.

Another batch is made from the same homopolymer of ethyl acrylate using the following recipe:

| | Parts by weight |
|---|---|
| (1) Portland cement (Type I) | 667 |
| (2) Sand | 333 |
| (3) Water | 20 |
| (4) Antifoaming agent | 1.0 |
| (5) Water reducing agent | 3.0 |
| (6) Polyethyl acrylate latex (36% solids) | 180 |
| (7) Trap rock | 1000 |

After this cementitious composition has been prepared and cured in the same manner, it is found that the dry tensile strength is 687 p.s.i. (as compared to 1000 for the previous example) and that the adhesive strength is 162 p.s.i. (as compared to 215 p.s.i.). The polyethyl acrylate latex of this example is found to have a much lower pH than the latex of the previous example probably because of the absence of the ammonium caseinate. This shows that there is a hydrolysis of the ester groups on the polymer backbone which converts such groups to acid groups while forming ethyl alcohol.

Another cement composition is prepared using a copolymer of 73% ethyl acrylate, 25% methylmethacrylate and 2% methacrylic acid, which copolymer is prepared by a conventional emulsion polymerization and has a glass transition temperature of about 5° C. The recipe is as follows:

| | Parts by weight |
|---|---|
| (1) Portland cement (Type I) | 667 |
| (2) Sand | 333 |
| (3) Water | 15 |
| (4) Antifoaming agent (waxy alcohol) | 1.0 |
| (5) Water reducing agent | 3.0 |
| (6) Copolymer latex (36% solids) | 180 |
| (7) Trap rock | 1000 |

The composition is mixed and cured as in the two previous examples and is found to have a dry tensile strength of 490 p.s.i. and an adhesion strength of 158 p.s.i.

Another cementitious composition is prepared using the same terpolymer latex as in the immediately preceding example in accordance with the following recipe:

| | Parts by weight |
|---|---|
| (1) Portland cement (Type I) | 667 |
| (2) Sand | 333 |
| (3) Water | 25 |
| (4) Ammonium caseinate | 14 |
| (5) Antifoaming agent | 1.0 |
| (6) Water reducing agent | 3.0 |
| (7) Copolymer latex (36% solids) | 16.7 |
| (8) Trap rock | 1000 |

After this composition has been prepared and cured as in the previous example, it was found that the adhesive strength was 250 p.s.i. as compared to 158 p.s.i. for the previous example using the same latex.

A third cementitious composition is prepared from the same terpolymer latex as in the two previous examples using the following recipe:

| | Parts by weight |
|---|---|
| (1) Portland cement (Type I) | 667 |
| (2) Sand | 333 |
| (3) Water | 15 |
| (4) Antifoaming agent | 1.0 |
| (5) Water reducing agent | 1.0 |
| (6) Copolymer latex (36% solids) | 184 |

When this composition is mixed and cured as in the previous examples, the adhesive strength is found to be 225 p.s.i. which is somewhat less than that with the previous composition employing ammonium caseinate.

Another cement composition is prepared from a homopolymer of ethyl acrylate having a glass transition temperature of −21° C. using the following recipe:

| | Parts by weight |
|---|---|
| (1) Portland cement (Type I) | 667 |
| (2) Sand | 333 |
| (3) Water | 15 |
| (4) Antifoaming agent (waxy alcohol) | 1.0 |
| (5) Water reducing agent | 1.2 |
| (6) Polyethylacrylate latex (36% solids) | 186 |
| (7) Trap rock | 1000 |

When this composition is mixed and cured as in the previous five examples, the adhesion strength is found to be 476 p.s.i. The homopolymer of this example is formed as in the previous example except that pH is maintained at about 11 during the polymerization. This apparently results in improved adhesive strength of the cured cementitious material.

Another cementitious composition is prepared using the same homopolymer of ethyl acrylate as in the immediately preceding example using the following recipe:

|   | Parts by weight |
|---|---|
| (1) Portland cement (Type I) | 667 |
| (2) Sand | 333 |
| (3) Water | 75 |
| (4) Antifoaming agent | 1.0 |
| (5) Water reducing agent | 1.0 |
| (6) Homopolymer latex (36% solids) | 100 |
| (7) Trap rock | 1000 |

When this composition is mixed and cured as in the previous examples, the adhesive strength is found to be 420 p.s.i. This shows that good adhesive strength may be obtained using a much lower ratio of latex solids to cement and much more water.

Another cement composition is prepared from a copolymer of 73% ethyl acrylate and 27% methylmethacrylate which is prepared exactly the same as the terpolymer of the previous examples except that the 2% of methacrylic acid is not used. The glass transition temperature is again calculated to be about +5° C. The recipe used is as follows:

|   | Parts by weight |
|---|---|
| (1) Portland cement (Type I) | 667 |
| (2) Sand | 333 |
| (3) Water | 15 |
| (4) Antifoaming agent | 1.0 |
| (5) Water reducing agent | 1.0 |
| (6) Copolymer latex (34% solids) | 186 |
| (7) Trap rock | 1000 |

The composition is mixed and cured for 6 days as in the previous examples and is found to have a dry tensile strength of 835 p.s.i. and an adhesive strength of 330 p.s.i. This shows that cement compositions made from a copolymer of 73% ethylacrylate and 27% methylmethacrylate are at least as good as cement compositions made from a similar copolymer containing 2% methacrylic acid. There is apparently no gain in physical properties by having the methacrylic acid present in the copolymer.

In the above examples, the antifoaming agent may be a conventional antifoam material such as a silicone, a long-chain alcohol, such as dray wax, lauryl alcohol, stearyl alcohol, or the like. In the examples, any conventional water-reducing agent or cement dispersing agent may be used such as purified calcium lignin sulfonate or other purified ligno-sulfonates, salts of hydroxylated carboxylic acid, amine salts of modified hydroxylated carboxylic acids, etc. The active solid ingredients of waste sulfite liquor (preferably dialyzed) may also be used. Small amounts of antimycotics, such as sodium phenates or chloro phenates or other water-soluble mercurials, etc., are also suitable for use in the compositions of this invention.

In each of the above examples, various commercial polyacrylic latices may be employed as the "polyacrylic latex" provided that the polymer of the latex is a film-forming polymer having a second-order transition temperature below room temperature. Most of these commercial latices include a small amount of an unsaturated acid as disclosed, for example, in United States Patent No. 2,790,735 or 2,795,564, but such acid may be omitted from the polymer. Thus excellent results can be obtained using polyacrylic latices which are terpolymers of acrylic ester monomers and a very small amount of methacrylic acid, acrylic acid or other unsaturated acid such as those formed by copolymerizing an alkyl acrylate, such as 2-ethyl hexyl acrylate or ethyl acrylate, with another acrylate, such as butyl acrylate, methylmethacrylate or ethyl methacrylate.

In the practice of this invention, it is not practical to use a polyacrylate polymer with a glass transition temperature above ambient temperature in conjunction with a plasticizer for such polymer in an attempt to improve the adhesive properties of the polymer because plasticizers reduce the bond of the latex to the cement and thus reduce the strength of the cured cementitious composition, both in tension and compression, and also lower the adhesive strength.

The polyacrylate emulsions used in the cement compositions of this invention, exhibit adequate stability in the presence of inorganic complexes found in hydraulic cements. This is not generally true of emulsions formed from polyacrylonitrile, polybutadiene and the polyvinyl acetals.

Unless the context shows otherwise, the term "polymer" is used herein to cover homopolymers as well as copolymers and the term "copolymer" covers polymers of two or more polymerizable monomers.

Unless the context shows otherwise, amounts and percentages are by weight, and "parts" means parts by weight.

It will be understood that the above description is by way of illustration rather than limitation and that, in accordance with the provisions of the patent laws, variations and modifications of the specific methods, compositions and products disclosed herein may be made without departing from the spirit of the invention.

Having described my invention, I claim:

1. A free-flowing predominantly cementitious composition for producing a rigid acid-resistant material of high adhesive strength comprising sand, a hydraulic cement, water and water-dispersed particles of a water-insoluble film-forming acrylate polymer of a monomeric material comprising at least one alkyl ester of an acrylic acid having 3 to 4 carbon atoms, the alkyl radical of said ester having up to 18 carbon atoms, said polymer being present in a substantial amount and having a second-order transition temperature below room temperature, the amount by weight of said polymer being no greater than about one part of polymer for each 3.7 parts of cement.

2. A cementitious composition as defined in claim 1, wherein said film-forming polymer is a member of the group consisting of homopolymers and copolymers of alkyl esters of acrylic acid having up to 18 carbon atoms in the alkyl radical.

3. A cementitious composition as defined in claim 1, wherein said polymer is a homopolymer of an ester of acrylic acid.

4. A composition as defined in claim 1, wherein at least the major portion of said monomeric material is an alkyl ester of acrylic acid having 1 to 4 carbon atoms in the alkyl radical.

5. A composition as defined in claim 1, wherein said polymer is a copolymer of an ester of alpha-methyl acrylic acid and an ester of acrylic acid.

6. A cementitious composition of a consistency lending itself to working comprising sand, a hydraulic cement, water, and a substantial amount of minute water dispersed particles of a water-insoluble film-forming acrylate polymer of a monomeric material comprising alkyl esters of acrylic acids having up to 4 carbon atoms, said polymer having a second-order transition temperature below room temperature and being present in an amount no greater than about one part of polymer for each 3.7 parts of cement.

7. A rigid acid-resistant material having a high tensile strength comprising a hydraulic cement, combined water in an amount sufficient to hydrate said cement, and a substantial amount of an aqueous emulsion of a water-insoluble film-forming polymer of a monomeric material composed predominantly of alkyl esters of acrylic acid, said film-forming polymer having a second-order transition temperature below room temperature, the amount of said cement being about 50 to about 150 parts and the amount of said polymer being no greater than that present in about 40 parts by weight of a polyacrylate latex having a solids content of about 46 to 47%.

8. A hard acid resistant concrete formed of a cementitious composition comprising major amounts of aggregate and hydraulic cement and substantial amounts of water-dispersed particles of a water-insoluble film-forming polymer having a second-order transition temperature below room temperature, said particles having a particle size of from 0.1 to 1.0 micron, said film-forming polymer being a polymerization product of a monomeric material comprising essentially alkyl esters of alcohols having up to 18 carbon atoms and acrylic acids having up to 4 carbon atoms, said concrete containing combined water in an amount sufficient to hydrate said cement, the amount of said cement being about 50 to about 150 parts and the amount of said polymer corresponding to that present in about 5 to about 40 parts by weight of a polyacrylate latex having a solids content of about 46 to 47%.

9. A masonry composition of high adhesive strength comprising about 50 to about 150 parts by weight of a hydraulic cement, about 50 parts of sand, and about 5 to 40 parts of polyacrylate latex having a solids content of 40 to 50%, said latex containing a film-forming polymer of a monomeric material comprising predominantly an alkyl ester of acrylic acid having one to 4 carbon atoms in the alkyl radical, said polymer having a second order transition temperature below room temperature and being present in a substantial amount to provide said adhesive strength and to increase materially the resistance to hydrolysis by aqueous media, the amount of water in said composition being not in excess of 55 parts.

10. A process of repairing a damaged concrete surface which has been thoroughly cleaned, comprising the steps of applying to said surface a free-flowing predominantly cementitious composition containing major amounts of sand and hydraulic cement, a polyacrylate latex, and a sufficient amount of water to form a paste, spreading the paste to shape the surface thereof, and allowing the paste to solidify in place in contact with said damaged surface, said latex containing a film-forming polymer of a monomeric material comprising at least one alkyl ester of acrylic acid, said polymer having a second-order transition temperature below the temperature of said composition and being present in an amount sufficient to provide an adhesive strength of at least 300 pounds per square inch, the amount by weight of said polymer being no greater than about one part of polymer for each 3.7 parts of cement.

11. A cementitious composition for use as a paint, adhesive grout, mortar or the like comprising a major amount of hydraulic cement and sand, the ratio of sand to cement being from about 3:1 to 1:3, and a minor amount of minute particles of a water-insoluble film-forming polyacrylate formed by polymerizing a monomeric material comprising essentially alkyl esters of an acrylic acid having 3 to 4 carbon atoms, said polymer having a second-order transition temperature below 16° C., said particles having a particle size of about 0.1 to about 1.0 micron, the amount by weight of said particles being no greater than about one part for each 3.7 parts of cement.

12. A cementitious composition of the character described comprising hydraulic cement and sand, the ratio of sand to cement being from 3:1 to 1:3, an amount of water sufficient to hydrate said cement, and a substantial amount of water-dispersed particles of a water-insoluble film-forming polyacrylate which is a polymerization product of a monomeric material comprising essentially alkyl esters of an acrylic acid having up to one alkyl group and up to 5 carbon atoms, a major portion of said monomeric material consisting of an alkyl ester of acrylic acid, said polymer having a second-order transition temperature below room temperature, the amount by weight of said polymer being no greater than about one part of polymer for each 3.7 parts of cement.

13. A strong hard rigid acid-resistant concrete comprising a major amount of sand and hydraulic cement, combined water in an amount sufficient to hydrate said cement, the ratio of sand to cement being from 3:1 to 1:3, and a substantial amount of an essentially acrylic film-forming polymer of alkyl esters of acrylic acids having no more than one alkyl group and no more than 5 carbon atoms, said polymer having a second-order transition temperature below room temperature, the amount by weight of said polymer being no greater than about one part of polymer for each 3.7 parts of cement.

14. A cementitious composition comprising 50 parts of sand, about 50 to about 150 parts of hydraulic cement, and up to about 40 parts by weight of a polyacrylate latex having a solids content of about 40 to about 50 percent, said latex comprising water and water-dispersed particles of a water-insoluble film-forming polyacrylate polymerization product of a monomeric material comprising essentially alkyl esters of an acrylic acid having up to one alkyl group and up to 5 carbon atoms, said monomeric material containing a major portion of an alkyl ester of acrylic acid, said polymerization product having a second-order transition temperature below room temperature.

15. A predominantly cementitious composition comprising a hydraulic cement, water in a quantity at least sufficient to form a paste, and water-dispersed particles of a water-insoluble film-forming polymer of a monomeric material comprising a major portion of an alkyl ester of acrylic acid having up to 18 carbon atoms, said polymer having a second-order transition temperature below room temperature and being present in an amount no less than about one part of polymer for each 20 parts of cement, the amount of said cement being about 50 to about 150 parts, the amount of said polymer being no more than that present in 40 parts by weight of a latex having a solids content of about 46 to 47 percent.

16. A hard acid-resistant concrete comprising sand and a hydraulic cement, the ratio of sand to cement being from 3:1 to 1:3, combined water in an amount sufficient to hydrate said cement, and a water-insoluble film-forming polymer of a monomeric material composed predominantly of an alkyl ester of acrylic acid having up to 18 carbon atoms, said polymer having a second-order transition temperature below room temperature and being present in an amount no less than about one part of polymer for each 20 parts of cement, the amount of said cement being no less than about 50 parts, the amount of said polymer being no greater than that present in about 40 parts by weight of a polyacrylate latex having a solids content of about 46 to 47 percent.

17. A cementitious composition of a consistency lending itself to working comprising a hydraulic cement, sand, and a polymeric latex derived from a water-insoluble film-forming copolymer of at least one monomer having the formula

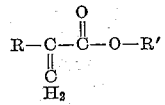

where R is selected from the group consisting of hydrogen and the lower alkyl radicals of the paraffin series, and wherein R' is a lower alkyl radical of the paraffin series, said copolymer having a second-order transition temperature below room temperature and being capable of reacting with said cement to produce a stable complex, said copolymer being present, in relation to the cement, in an amount less than one part of polymer for each 3.7 parts of cement but greater than one part for each 20 parts by weight of cement.

References Cited by the Examiner

UNITED STATES PATENTS 3,025,256 3/62 Janota et al. _____ 260—29.6

FOREIGN PATENTS 804,358 11/58 Great Britain.
1,156,882 12/57 France.
1,264,052 5/61 France.

MURRAY TILLMAN, *Primary Examiner.*

LEON J. BERCOVITZ, *Examiner.*